United States Patent [19]

Welter

[11] 4,246,950
[45] Jan. 27, 1981

[54] ASYMMETRIC RIM HUMPING

[75] Inventor: Thomas N. H. Welter, Keispelt, Luxembourg

[73] Assignee: The Goodyear Tire & Rubber Company, Akron, Ohio

[21] Appl. No.: 83,916

[22] Filed: Oct. 11, 1979

Related U.S. Application Data

[63] Continuation of Ser. No. 862,067, Dec. 19, 1977, abandoned.

[51] Int. Cl.³ ............................................. B60B 25/12
[52] U.S. Cl. ................................. 152/381.4; 301/97; 152/381.3
[58] Field of Search .................... 152/381.2, 375, 399, 152/381.1, 379.1; 301/917

[56] References Cited

U.S. PATENT DOCUMENTS

| 1,757,728 | 5/1930 | Martin | 152/381.1 |
| 2,198,978 | 4/1940 | Sauer | 152/381.2 |
| 2,948,568 | 8/1960 | Hykes et al. | 301/97 |
| 3,381,353 | 5/1968 | Lemmerz | 301/97 |
| 3,977,727 | 8/1976 | Glasenapp et al. | 301/97 |

FOREIGN PATENT DOCUMENTS 2248227  5/1972  Fed. Rep. of Germany ............ 301/97

Primary Examiner—Stephen G. Kunin
Assistant Examiner—Lawrence E. Williams
Attorney, Agent, or Firm—Frank Pincelli

[57] ABSTRACT

A wheel for a pneumatic tire designed to minimize bead unseating as described. The wheel has a radially extended portion on the rim thereof which provides a safety hump function and which gradually increases from a zero radial height at one end to a maximum predetermined radial height and then gradually decreases to a zero radial height at its other end.

26 Claims, 5 Drawing Figures

ASYMMETRIC RIM HUMPING

This is a continuation, of application Ser. No. 862,067 filed Dec. 19, 1977 now abandoned.

BACKGROUND OF THE INVENTION

This invention relates to a wheel for a pneumatic tire and more particularly to a wheel designed to minimize bead unseating during the use of the tire, especially in the uninflated state.

Bead retention has always been considered an important aspect of tire and wheel design. However, with the advent of run-flat safety tires, tires which are capable of being driven in the uninflated state for an extended distance, bead retention has become of even greater importance. When a tire is run in the uninflated state, there is a strong tendency for the bead portion of the tire to unseat from the rim of the wheel, which can present serious hazards to the safety of the occupants of the vehicle, and/or possibly cause damage to the tire itself.

It is well known to augment bead retention by some form of projection which extends radially outward from the bead seat between the tire bead and the wheel well so as to engage the toe of the bead to restrict axial displacement of the bead into the wheel well as is exemplified by U.S. Pat. Nos. 3,669,174; 2,409,666; 1,652,146; 3,664,405; and German DAS 2,363,175. Due to high cornering forces, such projections are usually insufficient to retain the bead in its seat when the tire is run in the uninflated condition. Additionally, projections such as exemplified in the above patents pose certain difficulties in mounting and demounting a tire from the wheel, therefore making automatic mounting and demounting impractical. Furthermore, the use of a localized projection may cause damage to a bead bundle due to stresses imposed upon it during use in the uninflated condition. It is also well known to provide a substantially continuous circumferential ridge around the rim as exemplified in U.S. Pat. No. 2,198,978. Safety humps such as this must of necessity be of relatively low profile so as not to project radially outwardly substantially above the surface of the rim seat. Otherwise, the safety rib would make it too difficult to mount the tire on the rim seats.

SUMMARY OF THE PRESENT INVENTION

A wheel in accordance with the present invention will allow for automatic tire mounting and demounting while providing means for securely maintaining the bead portion of the tire in its bead seat during use of the tire both in the inflated and uninflated state.

A wheel made in accordance with the present invention has a radial extended portion which gradually increases from a zero radial height at one end and proceeds along the circumferential length to a maximum predetermined radial height and subsequently decreases to a zero radial height at its other end. The radial extended portion at its point of maximum radial height may extend radially outward from the nominal rim diameter a distance equal to at least the distance in which the radially innermost points of the bead bundle of the tire mounted on a wheel extend radially outward from the nominal rim diameter. The maximum radial distance the extended portion may extend is equal to one-half of the flange height of the rim.

DESCRIPTION OF THE PREFERRED EMBODIMENT

Figure 1:
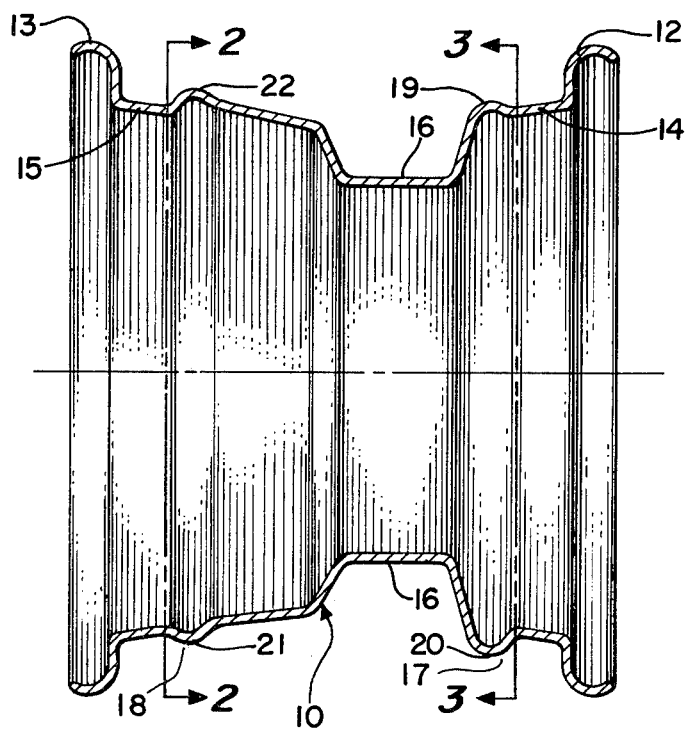
FIG. 1 is a cross-sectional plan view of a wheel according to the present invention.
Figure 4:
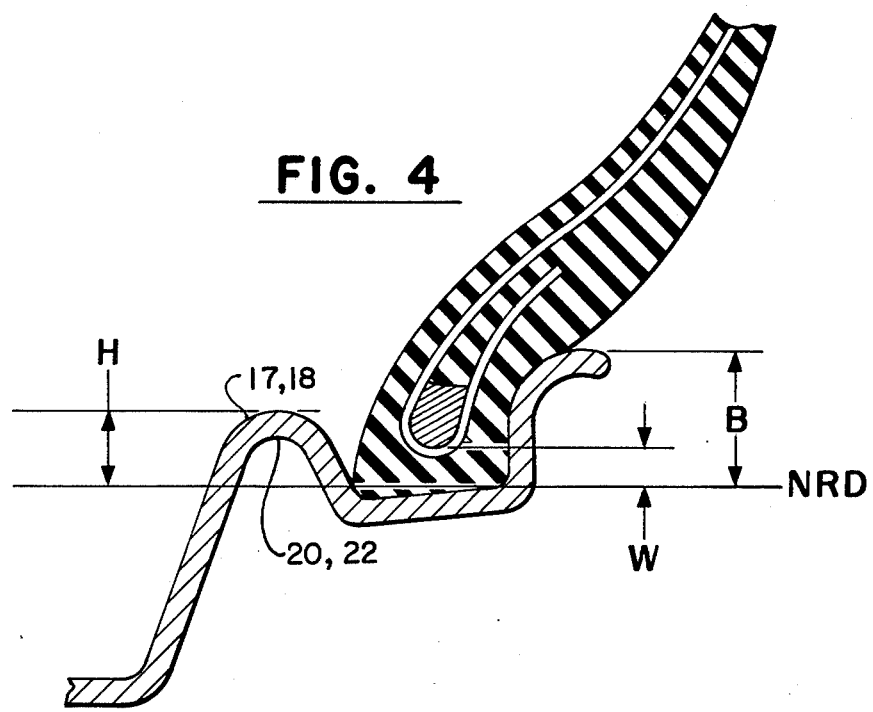
FIG. 4 is a fragmentary enlarged view of the wheel of FIG. 1 illustrating the bead portion of a tire mounted on the wheel and inflated to design inflation pressure.

Referring to FIG. 1, there is illustrated a wheel 10 made in accordance with the present invention. The wheel 10 comprises a pair of axially spaced flanges 12, 13, extending annularly around the wheel 10. The radially inner ends of the flanges 12,13 merge into the axially outer ends of a pair of bead seats 14, 15, respectively. The wheel 10 further comprises an annular wheel well portion 16 spaced axially inward of the beat seats 14,15. While the preferred embodiment illustrates wheel 10 with a wheel well portion 16, wheel well portion 16 may be omitted if desired. Spaced in between wheel wll portion 16 and bead seats 14, 15 are asymmetric safety humps 17, 18, respectively, which extend circumferentially completely about the wheel 10. The asymmetric safety humps 17, 18 are positioned such that when the tire is mounted on a wheel, as illustrated in FIG. 4, the hump 17, 18 facing the tire is adjacent to the toe portion of the tire. For the purposes of this invention, an asymmetric safety hump shall be considered a safety hump, which when viewed in a plane perpendicular to the rotation axis of the wheel, has a radial extended portion which gradually and continuously increases from a zero radial height at one end and proceeds along the circumferential length of the radial extended portion to a predetermined radial height and subsequently gradually and continuously decreases back to a zero radial height at the other end of the portion.

Preferably, as illustrated in FIGS. 1 and 4, the contour of the radially outermost surface of safety humps 17, 18 is convex as viewed in a cross-section from a plane containing the rotational axis of the wheel. Having such a contour facilitates the ease of tire mounting.

Figure 2:
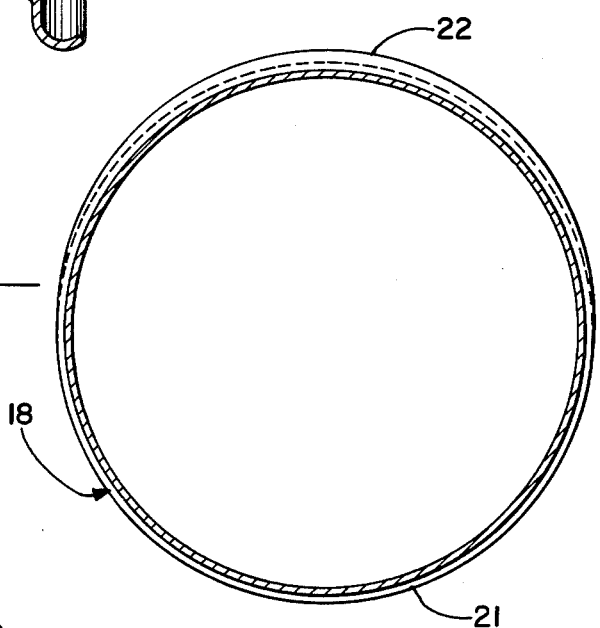
FIG. 2 is a cross-sectional view of the wheel of the present invention taken along line 2—2 of FIG. 1.
Figure 3:
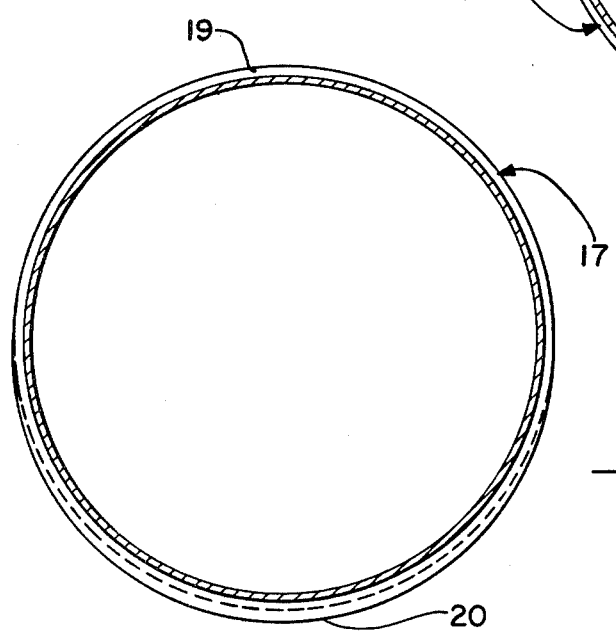
FIG. 3 is a cross-sectional view of the wheel of the present invention taken along line 3—3 of FIG. 1.

Referring to FIGS. 2 and 3, asymmetric safety humps 17, 18 are provided with radial extended portions 20, 22. As can be seen from the drawings, each radial extended portion 20, 22, when viewed in a plane extending perpendicularly to the rotational axis of the wheel 10, has a height, as measured radially of said axis, which is at one end of the portion at zero value and which, from said one end, increases continuously and gradually to a predetermined height and subsequently decreases continuously and gradually back to zero value at the other end of the portion. For the purpose of this invention, in all embodiments thereof, the term "gradually" means that the increase in height from zero to said predetermined height takes place over a circumferential length equivalent to an angle of at least ten degrees about the rotational axis of the wheel. Preferably the maximum radial height of each portion 20, 22 occurs midway between its ends. The remaining portions 19, 21 of safety humps 17, 18 have a constant radial height which generally does not extend beyond the height of standard safety humps presently known in the tire and wheel industry. In the embodiment illustrated, radial extended portions 20, 22, extend a circumferential distance about wheel 10 of at least 140°, generally in the range of 140° to 200°, preferably 180°. For the purpose of this invention, the radial height of radial extended portions 20, 22 is the distance between the radially outermost portion 20, 22 and the radial distance of portions 19, 21 at that point as shown with dotted lines in FIGS. 2 and 3. The radial extended portions 20, 22 may be placed congruently or as desired; preferably they are positioned at 180° from each other as illustrated in FIGS. 2 and 3. The dotted line shown in FIGS. 2 and 3 illustrates the path in which safety humps 17, 18 would have taken if it were not for radial extended portions 20, 22.

In the preferred embodiment, radial extended portions 20, 22 are shown as one continuous radial extended portion; however, portions 20, 22 may be constituted of a plurality of spaced projections, the radial height of which would follow the same path as continuous portions 20, 22 illustrated in FIGS. 2 and 3; that is, the radial height of each of the plurality of projections would start at a zero value at one end of the portion 20, 22 and gradually increase to a maximum predetermined radial height and subsequently decrease back to a zero radial height at the other end of portions 20, 22.

Referring to FIG. 4, each radial extended portion 20, 22 at its point of maximum radial height extends radially outward from the nominal rim diameter NRD a distance H equal to at least the distance W. The distance W being the radial distance from the nominal rim diameter to the radially innermost point of the bead core of a tire which is mounted on the wheel 10 and is inflated to design inflation pressure. For the purpose of this invention, the nominal rim diameter NRD is defined as a line parallel to the rotational axis of the tire and tangent to the head heel of the wheel. Radial extended portions 20, 22 at their point of maximum radial height H as measured from the nominal rim diameter NRD, may extend radially outward a maximum distance equal to about one-half of the flange height B.

Figure 5:
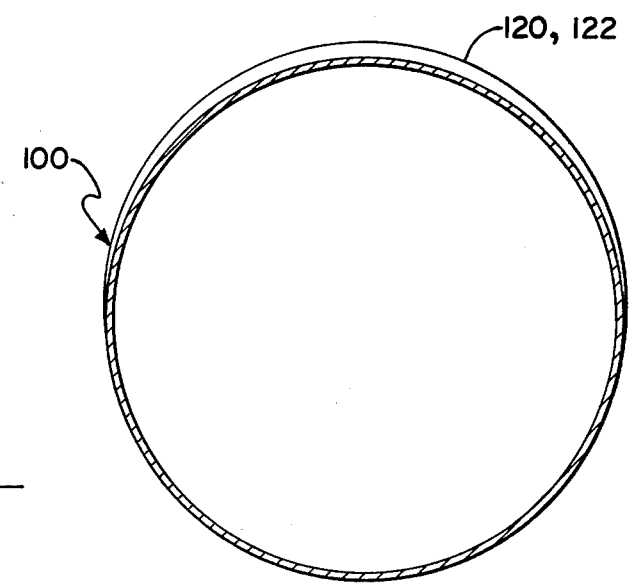
FIG. 5 is a cross-sectional view of a modified form of the wheel of the present invention.

FIG. 5 illustrates a modified form of the present invention. The wheel 100 illustrated in FIG. 5 is similar to the wheel 10 illustrated in FIGS. 1 through 4, like numerals representing identical parts. The wheel 100 is different from wheel 10 in that portions 19, 21 of safety humps 17, 18 are omitted. Radial extensions 120 and 122 are similar to radial extended portions 20, 22 of FIGS. 1 through 4, except that the ends of radial extensions 120, 122 start at a zero height from the axially outward bead seats 14, 15 whereby continuously and gradually increasing in height to the same limits previously discussed with respect to radially extended portions 20, 22. The extensions 120, 122 extend circumferentially about the wheel within limits previously discussed with respect to portions 20, 22 of safety humps 17, 18.

A wheel made in accordance with the present invention allows for easy manual or automatic mounting of the tire on the wheel and will minimize any injurious effects to the bead portion of the tire, and will minimize the risk of bead unseating during running of the tire both in its inflated and uninflated state.

What is claimed is:

1. A wheel for supporting a pneumatic tire provided with a pair of bead portions comprising:
    a pair of circumferentially extending flanges in axially spaced-apart relationship;
    a pair of rim seats of a first predetermined radius with respect to the rotational axis of said wheel for seating said bead portions of said tire, said rim seats merge from the axially inner ends of said flanges; said wheel characterized in that at least one rim seat is provided with an asymmetric hump for engagement with the axially inner surface of said bead portion adjacent said bead seat, said asymmetric hump consisting of a radially extended portion, said radially extended portion extends about the circumference of said wheel for at least a portion of said circumference at the same axial position on said wheel, the height of said radially extended portion starting from one circumferential end of said radially extending portion proceeding circumferentially about the wheel gradually and continuously increases to maximum radial height of a second predetermined radius with respect to the axis of rotation of said wheel then gradually and continuously decreases back to said first predetermined radius at the other circumferential end of said radially extended portion.

2. A wheel according to claim 1 wherein said radial extended portion extends about the wheel for at least 140°.

3. A wheel according to claim 1 wherein said radial extended portion extends about the wheel for at least 140° but less than 200°.

4. A wheel according to claim 1 wherein said radial extended portion extends about the wheel for approximately 180°.

5. A wheel according to claim 1 wherein said radial extended portion comprises one continuous projection.

6. A wheel according to claim 1 wherein the point of maximum radial height of said radially extended portion is spaced equidistance from the circumferential ends of said radially extended portion.

7. A wheel according to claim 1 wherein the point of maximum radial height of said radial extended portion is radially outward from the nominal rim diameter a distance equal to at least the radial distance between the nominal rim diameter of said wheel and the radially innermost point of the bead core of said tire mounted on said wheel.

8. A wheel according to claim 1 wherein said radial extended portion has a maximum radial height smaller than one-half the flange height of said wheel.

9. A wheel according to claim 1 wherein said radial extended portion at its point of maximum radial height is equal to about one-half the flange height.

10. A wheel according to claim 1 wherein the contour of the radially outermost surface of said radial extended portion as viewed in a cross-sectional plane containing the axis of the wheel is convex.

11. A wheel according to claim 1 wherein said radially extended portion comprises a plurality of radially extended projections.

12. A wheel according to claim 1 wherein said radial extended portion increases and decreases in radial height at a constant rate.

13. A wheel according to claim 1 wherein said wheel is further provided with a wheel well portion spaced in between said pair of rim seats.

14. A wheel for supporting a pneumatic tire provided with a pair of bead portions comprising:
    a pair of circumferentially extending flanges in axially spaced-apart relationship;

a pair of rim seats for seating said bead portions of said tire, said rim seats merge from the radially inner end of said flanges;

at least one safety hump being provided on one of said rim seats for engagement with the axially inner surface of said bead portion adjacent said rim seat, said safety hump extending completely about the circumference of said wheel and having a constant radial height of a first predetermined radius with respect to the rotational axis of said wheel;

said wheel characterized in that said safety hump is provided with an asymmetric hump for an engagement with the axially inner surface of said bead portion, said asymmetric hump comprising a radially extending portion, said radially extended portion extends about the circumference of said wheel for at least a portion of said circumference at the same axially position on said wheel, the height of said radially extended portion starting from one circumferential end of said radially extended portion proceeding circumferentially about the wheel gradually and continuously increases to a maximum radial height of a second predetermined radius with respect to the rotational axis of said wheel and then gradually and continuously decreases back to said first predetermined radius at the other circumferential end of said radially extended portion.

15. A wheel according to claim 14 wherein said radial extended portion extends about the wheel for at least 140°.

16. A wheel according to claim 14 wherein said radial extended portion extends about the wheel for at least 140° but less than 200°.

17. A wheel according to claim 14 wherein said radial extended portion extends about the wheel for approximately 180°.

18. A wheel according to claim 14 wherein said radial extended portion comprises a continuous projection.

19. A wheel according to claim 14 wherein the point of maximum radial height of said radial extended portion is spaced equidistance from the circumferential ends of said radially extended portion.

20. A wheel according to claim 14 wherein the point of maximum radial height of said radial extended portion is radially outward from the nominal rim diameter a distance equal to at least the radial distance between the nominal rim diameter of said wheel and the radially innermost point of the bead core of said tire mounted on said wheel.

21. A wheel according to claim 14 wherein said radial extended portion has a maximum radial height smaller than one-half the flange height of said wheel.

22. A wheel according to claim 14 wherein said radial extended portion at its point of maximum radial height is equal to about one-half the flange height.

23. A wheel according to claim 14 wherein the contour of the radially outermost surface of said radial extended portion as viewed in a cross-sectional plane containing the axis of the wheel is convex.

24. A wheel according to claim 14 wherein said radially extended portion comprises a plurality of radially extended projections.

25. A wheel according to claim 14 wherein said radial extended portion increases and decreases in radial height at a constant rate.

26. A wheel according to claim 14 wherein said wheel is further provided with a wheel well portion spaced in between said pair of rim seats.

* * * * *